United States Patent
Sakai et al.

(10) Patent No.: US 9,153,983 B2
(45) Date of Patent: Oct. 6, 2015

(54) CHARGING DEVICE

(71) Applicant: SONY MOBILE COMMUNICATIONS INC., Minato-ku (JP)

(72) Inventors: Daisuke Sakai, Tokyo (JP); Kuniharu Suzuki, Tokyo (JP); Katsuya Suzuki, Tokyo (JP); Koichi Jochi, Tokyo (JP)

(73) Assignees: SONY Corporation, Tokyo (JP); Sony Mobile Communications Inc., Tokyo (JP)

( * ) Notice: Subject to any disclaimer, the term of this patent is extended or adjusted under 35 U.S.C. 154(b) by 418 days.

(21) Appl. No.: 13/680,889

(22) Filed: Nov. 19, 2012

(65) Prior Publication Data

US 2013/0169215 A1 Jul. 4, 2013

Related U.S. Application Data

(60) Provisional application No. 61/581,353, filed on Dec. 29, 2011.

(51) Int. Cl.
| | |
|---|---|
| H01R 11/30 | (2006.01) |
| H02J 7/00 | (2006.01) |
| H01R 13/62 | (2006.01) |
| H01R 13/703 | (2006.01) |
| H01R 103/00 | (2006.01) |
| H01R 31/06 | (2006.01) |

(52) U.S. Cl.
CPC .......... *H02J 7/0042* (2013.01); *H01R 13/6205* (2013.01); *H01R 13/7039* (2013.01); *H02J 7/0032* (2013.01); *H01R 31/065* (2013.01); *H01R 2103/00* (2013.01)

(58) Field of Classification Search
CPC .................................................... H01R 13/6205
USPC ...................................... 439/38, 39; 320/107
See application file for complete search history.

(56) References Cited

U.S. PATENT DOCUMENTS

| | | | | |
|---|---|---|---|---|
| 3,842,403 | A * | 10/1974 | Konopka | 398/111 |
| 7,311,526 | B2 * | 12/2007 | Rohrbach et al. | 439/39 |
| 7,641,477 | B2 * | 1/2010 | DiFonzo et al. | 439/39 |
| 2009/0184679 | A1 * | 7/2009 | Yeh | 320/108 |

OTHER PUBLICATIONS http://www.apple.com/macbookair/spec.html, 5 pages.

* cited by examiner

*Primary Examiner* — Drew A Dunn
*Assistant Examiner* — Zixuan Zhou
(74) *Attorney, Agent, or Firm* — Oblon, McClelland, Maier & Neustadt, L.L.P.

(57) ABSTRACT

A charging device including a first connector connected to a power source; a second connector connected an electronic device; a magnetic element connected to a magnet of the electronic device; a magnetic sensor that detects a magnetic force generated by the magnet of the electronic device; and a switch circuit disposed between the first connector and the second connector and that switches between an open state and a closed state based on an output of the magnetic sensor.

14 Claims, 6 Drawing Sheets

CHARGING DEVICE

CROSS REFERENCE TO RELATED APPLICATION

The present application claims the benefit of the earlier filing date of U.S. Provisional Patent Application Ser. No. 61/581,353 filed on Dec. 29, 2011, the entire contents of which is incorporated herein by reference.

BACKGROUND

1. Field of the Disclosure

The present disclosure relates to a charging device for an electronic device including a secondary battery.

2. Description of Related Art

In general, electronic devices such as portable terminals, portable music players, digital cameras, gaming devices, and small-sized PCs include a secondary battery built therein. The secondary battery is charged utilizing a charging device. The charging device is typically a device that is connected between a commercial power source and the electronic device and that converts an alternating voltage obtained from the commercial power source into a direct voltage suitable for the electronic device to supply charge power to the electronic device.

A connection portion that connects the charging device to the electronic device uses a connector and terminals that may have a variety of shapes. Some electronic devices incorporate a magnet in the connector so that the charging device and the electronic device are connected to each other using a magnetic force. Such a connector allows a user to easily connect the connector. In addition, the connector is easily disconnected in the case where the user trips over a cable for the charging device, for example. Therefore, advantageously, the main body of the charging device is not pulled to fall down, and degradation of and damage to the cable and the connector can be prevented.

SUMMARY

With the connector which utilizes a magnet discussed above, however, a piece of metal may be attracted to the magnet to short-circuit the terminals or cause an erroneous operation. In order to prevent such a problem, some products available on the market use a connector that connects between the charging device and the electronic device and that includes a positive terminal, a GND terminal, and an ID terminal to allow the charging device to output power after predetermined authentication is made using the ID terminal. Such authentication is made to see whether or not a proper electronic device is correctly connected to the charging device. This disadvantageously increases the number of charging terminals (number of pins) and the size of the connector, and complicates the structure.

Against such background, the inventors recognize the desirability to reduce the possibility of an erroneous operation of a charging device for an electronic device without increasing the number of terminals of a connector for connection to the electronic device.

According to an embodiment of the present disclosure, there is provided charging device including a first connector connected to a power source; a second connector connected an electronic device; a magnetic element connected to a magnet of the electronic device; a magnetic sensor that detects a magnetic force generated by the magnet of the electronic device; and a switch circuit disposed between the first connector and the second connector and that switches between an open state and a closed state based on an output of the magnetic sensor.

The configuration makes it possible that no power is output from the charging device when the second connector is not connected to the electronic device without increasing the number of pins of the second connector. As a result, it is possible to secure safety by eliminating the risk of an erroneous operation of the charging device and hence of a short circuit between the output terminals of the second connector.

DETAILED DESCRIPTION

Embodiments of the present disclosure will be described in detail below with reference to the drawings.

Figure 1:
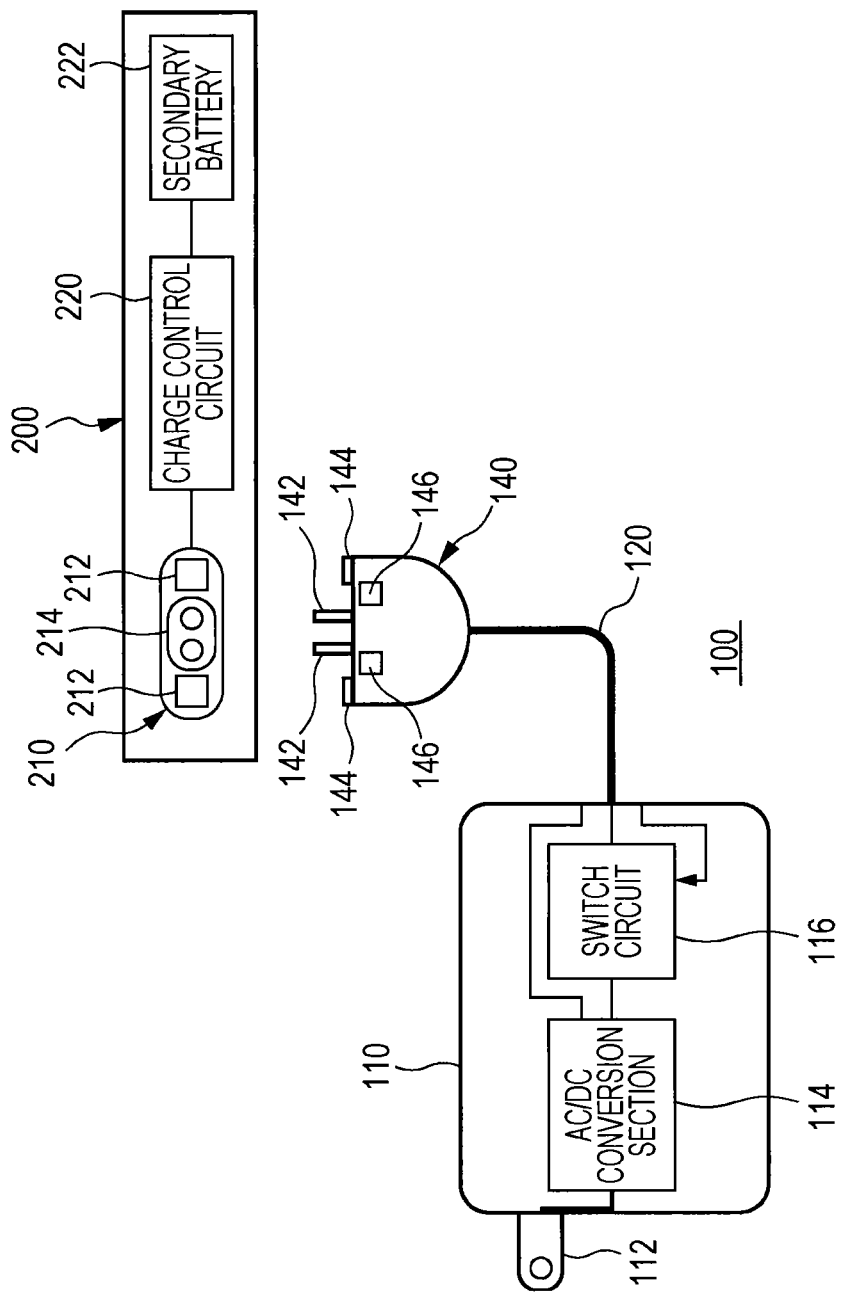
FIG. 1 shows a schematic configuration of a charging device according to an embodiment of the present disclosure and an electronic device including a secondary battery to be charged by the charging device.

FIG. 1 shows a schematic configuration of a charging device 100 according to an embodiment and an electronic device 200 including a secondary battery to be charged by the charging device 100.

The charging device 100 includes a body portion 110, a plug 140, and a cable 120 that connects between the body portion 110 and the plug 140.

A plug terminal 112 to be inserted into a receptacle (outlet) for a commercial power source projects from a side surface of the body portion 110. The plug terminal 112 constitutes a first connector to be connected to the power source. The body portion 110 includes built therein an alternating/direct (AC/DC) voltage conversion section 114 and a switch circuit 116. The switch circuit 116 includes a switch that transmits/blocks a voltage to be supplied to the plug 140 serving as a second connector.

The plug 140 constitutes a connector that supplies a charge voltage to the electronic device 200 serving as a device to be connected. More specifically, the plug 140 includes metal plates 144 and magnetism sensors 146 built in the plug 140, and two connector terminals 142 projecting from the front surface of the plug 140. The metal plates 144 constitute a magnetic material portion to be attracted to a portion to be connected by a magnetic force generated by magnets 212 provided in a connection portion of the electronic device 200 when connecting the plug 140 to the electronic device 200. The magnetism sensors 146 are each a sensor that detects the magnetic force generated by the magnets 212 provided in the electronic device 200, more specifically a sensor that detects approach of the magnets 212. In order to avoid the influence of the metal plates 144 on the magnetism sensors 146, the magnetism sensors 146 and the metal plates 144 are disposed to be shifted from each other.

The plug 140 is provided with only two connector terminals 142 (pins), namely a positive terminal and a GND terminal, which enables a reduction in size of the connector.

The switch circuit 116 provided in the charging device 100 receives a signal from the magnetism sensors 146 to control power lines (positive and GND). That is, when the magnetism sensors 146 detect magnetism, the switch circuit 116 is closed to transmit a direct voltage to the electronic device 200. When the magnetism sensors 146 do not detect magnetism, the switch circuit 116 is opened to block the direct voltage to the electronic device 200.

A connection portion 210 to which the plug 140 of the charging device 100 is to be connected is provided on the electronic device 200 side. The connection portion 210 includes a socket 214 and the magnets 212 disposed around the socket 214. When the plug 140 of the charging device 100 is connected to the connection portion 210 of the electronic device 200, a secondary battery 222 is charged through the terminals 142 by a charge control circuit 220 provided in the electronic device 200. The charge control circuit 220 is a circuit known in the art that controls protection of the secondary battery 222 from overcharging and overdischarging, suppression of overcurrent, and so forth.

Thus, in the embodiment, the magnetism sensors 146 are provided in a connector portion (plug 140) provided on the charging device side in a charging system in which connector connection between the charging device 100 and the electronic device 200 is assisted by attraction due to a magnetic force. Providing the magnetism sensors 146 allows a reduction in possibility of an erroneous operation without the need to add pins for ID terminals to the connector portion (the plug 140 and the socket 214) and hence to increase the size of the connector.

Figure 2:
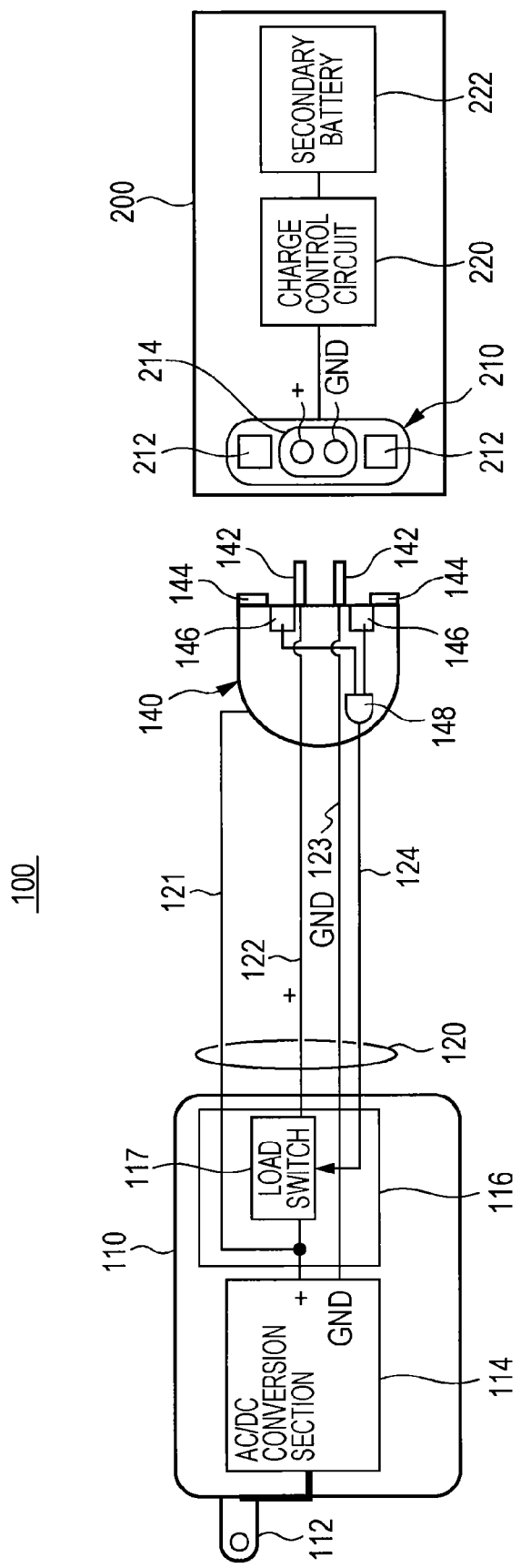
FIG. 2 shows a specific example of the internal configuration of the charging device shown in FIG. 1.

FIG. 2 shows a specific example of the internal configuration of the charging device 100 shown in FIG. 1.

The plug 140 includes the first and second magnetism sensors 146 which are disposed to face the connection portion 210 of the electronic device 200, and in the example on both sides of the socket 214. The plug 140 also includes a gate circuit 148 built therein. When both the first and second magnetism sensors 146 detect a magnetic force, the gate circuit 148 generates a signal indicating such detection to output the signal to a control signal line 124 as a control signal for the switch circuit 116. In the example, the gate circuit 148 is constituted by a logical sum (AND) gate.

The switch circuit 116 provided in the body portion 110 includes a load switch 117 that is closed/opened (turned on/off) to transmit/block the direct voltage (positive) output from the AC/DC conversion section 114. The cable 120 includes a sensor/gate power line 121, a power output line 122 for the direct voltage (positive), a power output line 123 for GND, and the control signal line 124. The sensor/gate power line 121 is a line that supplies the power source voltage to the magnetism sensors 146 and the gate circuit 148 provided in the plug 140 irrespective of whether the load switch 117 is opened or closed. The control signal line 124 is a line that transmits output of the gate circuit 148 to the switch circuit 116 of the body portion 110.

The configuration described above makes it possible that no power is output from the charging device 100 when the plug 140 is not connected to the electronic device 200 without increasing the number of pins of the second connector. As a result, it is possible to secure safety by eliminating the risk of an erroneous operation of the charging device 100 and hence of a short circuit between the output terminals of the plug 140.

While a plurality of magnetism sensors 146 are used in the example, a single magnetism sensor 146 may rather be used. In this case, the gate circuit 148 is not necessary. However, use of a plurality of magnetism sensors 146 allows to recognize with increased certainty that the plug 140 is properly connected to the device to be connected. For example, use of a plurality of magnetism sensors 146 prevents erroneous power output in the case where a magnet irrelevant to the device to be connected erroneously adheres to only a part of the plurality of magnetism sensors.

Figure 3:
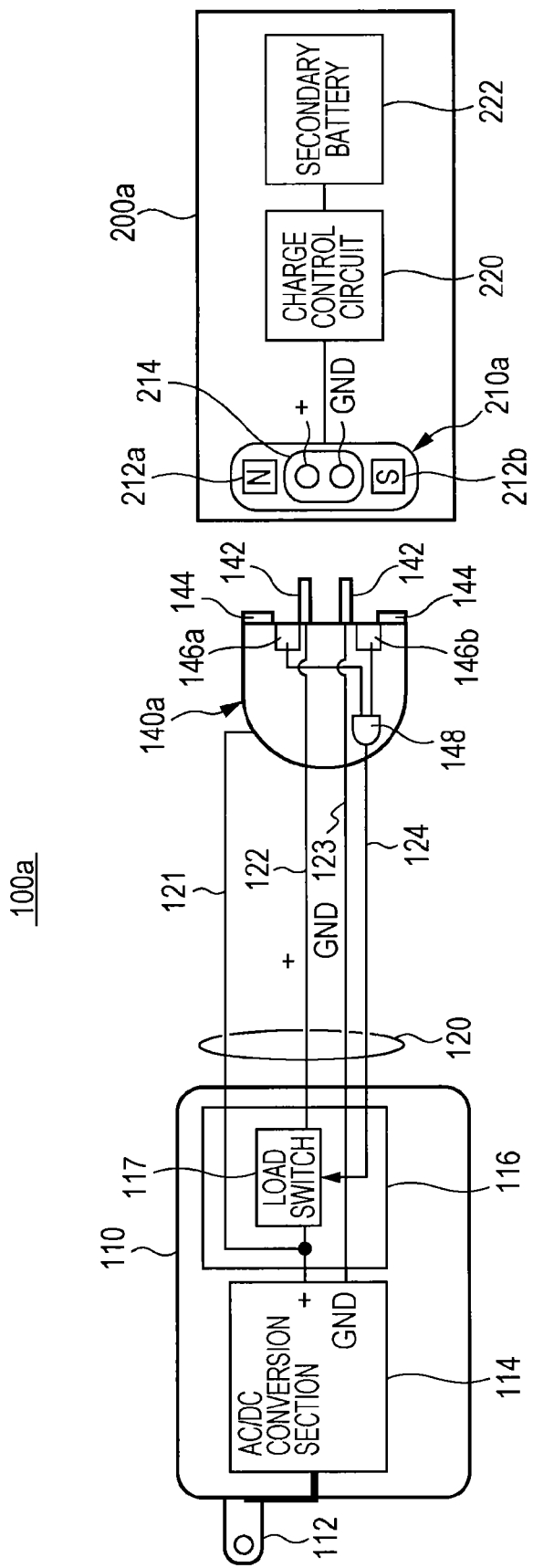
FIG. 3 shows an example of the configuration of a charging device which is a modification of the charging device shown in FIG. 2.

FIG. 3 shows an example of the configuration of a charging device 100a which is a modification of the charging device 100 shown in FIG. 2. Elements that are similar to the elements shown in FIG. 2 are denoted by the same reference numerals to omit repeated description. The configuration shown in FIG. 3 is different from the configuration shown in FIG. 2 in that the magnets 212 are replaced with a first magnet 212a and a second magnet 212b provided in a connection portion 210a of an electronic device 200a with different polarities oriented toward the surface of connection. In the example, the N pole of the first magnet 212a is oriented toward the surface of connection, and the S pole of the second magnet 212b is oriented toward the surface of connection. Correspondingly, a plug 140a includes first and second magnetism sensors that detect a magnetic force with a predetermined polarity when the plug 140a is connected to the connection portion 210a of the electronic device 200a. In the example, a magnetism sensor 146a that detects an N pole and a magnetism sensor 146b that detects an S pole are used. The configuration shown in FIG. 3 is otherwise the same as the configuration shown in FIG. 2.

In the case where the charging device supplies the electronic device with power in the form of a direct voltage, it is necessary that the connector terminals of the plug 140a should be connected in the correct orientation such that the polarity of the input voltage matches the polarity of the socket on the electronic device side. In the configuration shown in FIG. 3, the switch circuit 116 is closed only in the case where the plug 140a is connected in the correct orientation, and the switch circuit 116 is opened otherwise. This prevents supply of a voltage with a wrong polarity to the electronic device 200a.

Figure 4:
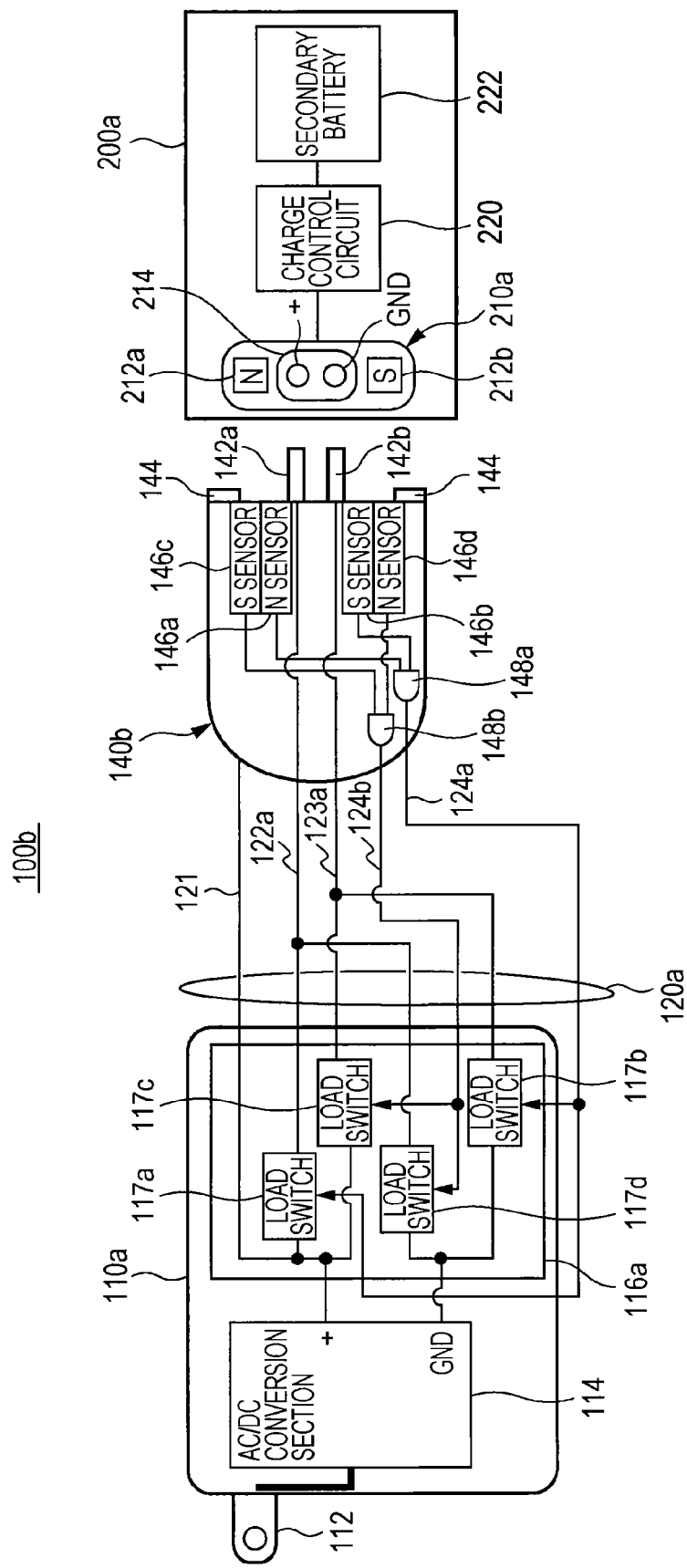
FIG. 4 shows an example of the configuration of a modification of the charging device shown in FIG. 3.

FIG. 4 shows an example of the configuration of a charging device 100b which is a modification of the charging device 100a shown in FIG. 3. Elements that are similar to the elements shown in FIG. 3 are denoted by the same reference numerals to omit repeated description. In the configuration shown in FIG. 3, the switch circuit 116 is opened not to supply power to the electronic device 200a in the case where the orientation of the plug 140a connected to the electronic device 200a is not correct. In the configuration shown in FIG. 4, in contrast, power with a correct polarity is supplied to the electronic device 200a regardless of the orientation of a plug 140b.

For this purpose, the configuration shown in FIG. 4 is different from the configuration shown in FIG. 3 in that the plug 140b includes magnetism sensors 146a and 146c disposed at a position opposite one of the magnets, 212a, of the connection portion 210a to detect an N pole and an S pole, respectively. The plug 140b also includes magnetism sensors 146d and 146b disposed at a position opposite the other magnet 212b to detect an N pole and an S pole, respectively. The plug 140b further includes a gate circuit 148a that receives output of the magnetism sensor 146a and output of the magnetism sensor 146b and a gate circuit 148b that receives output of the magnetism sensor 146c and output of the magnetism sensor 146d.

Meanwhile, a body portion 110a of the charging device 100b is provided with two pairs (a total of four) load switches 117a to 117d serving as a switch circuit 116a. The switches 117a to 117d have a function of reversing the polarity of a voltage to be supplied to the plug 140b in accordance with the results of detection performed by the magnetism sensors 146a to 146d. That is, a first pair of load switches 117a and 117b are controlled so as to be turned on/off in accordance with a control signal output from the gate circuit 148a to a control signal line 124a. When the load switches 117a and 117b are turned on, a positive voltage is output to a connector terminal 142a through a power output line 122a, and GND is output to a connector terminal 142b via a power output line 123a. A second pair of load switches 117c and 117d are controlled so as to be turned on/off in accordance with a control signal output from the gate circuit 148b to a control signal line 124b. When the load switches 117c and 117d are turned on, a positive voltage is output to the connector terminal 142b through the power output line 123a, and GND is output to the connector terminal 142a via the power output line 122a.

Thus, in the configuration of FIG. 4, a cable 120a includes the sensor/gate power line 121, the power output line 122a, the power output line 123a, the control signal line 124a, and the control signal line 124b.

While use of only one pair of magnetism sensors allows to see whether or not the plug is oriented in one specific direction, use of two pairs of magnetism sensors allows to reliably see whether the plug is connected correctly for both the two directions.

The configuration of FIG. 4 allows a user to connect the plug 140b to the socket 214 of the connection portion 210a in any orientation without considering the correct orientation of the plug 140b upon each connection.

Figure 5:
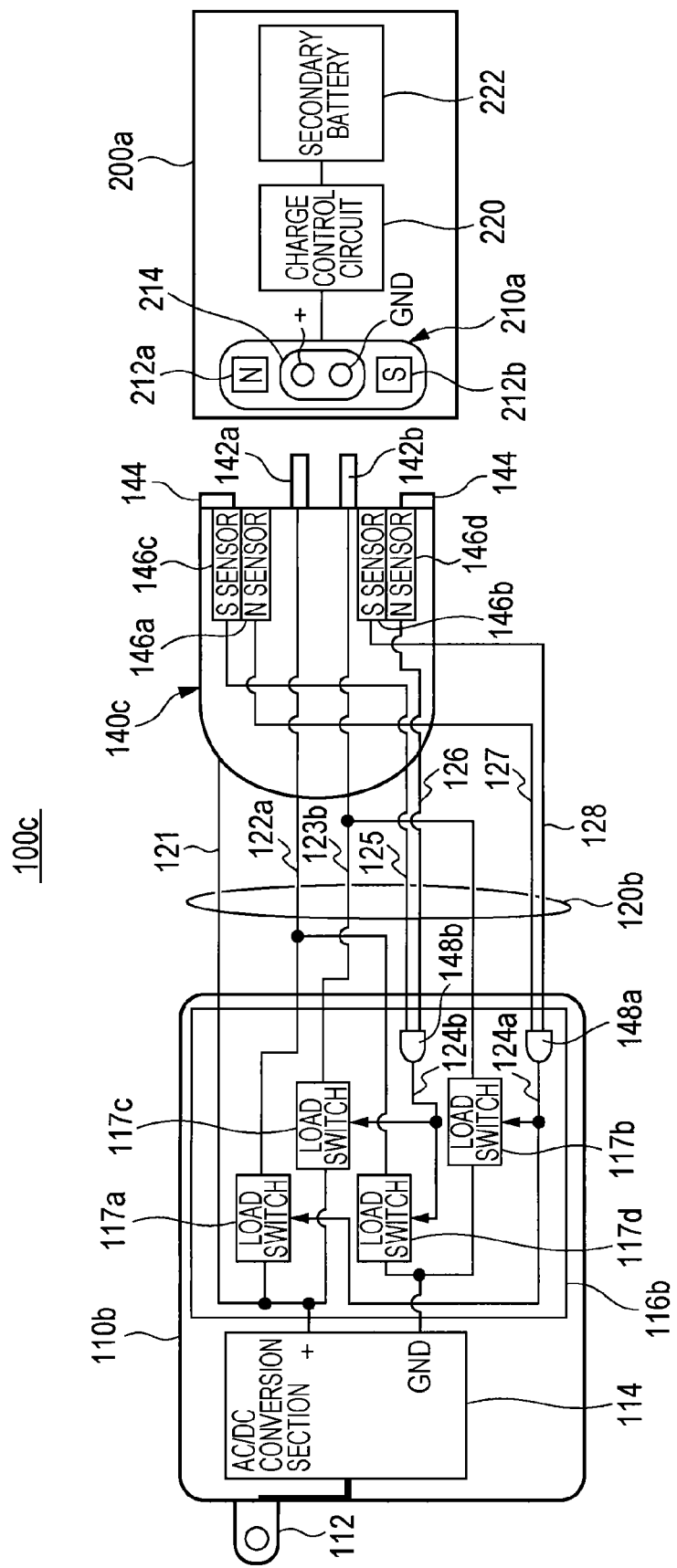
FIG. 5 shows a modification of the configuration shown in FIG. 4.

FIG. 5 shows a modification of the configuration shown in FIG. 4. Elements that are the same as the elements shown in FIG. 4 are denoted by the same reference numerals to omit overlapping description. In the modification, the gate circuits 148a and 148b provided in the plug 140b of the charging device 100b of FIG. 4 have been removed from a plug 140c of a charging device 100c. The gate circuits 148a and 148b have been moved into a body portion 110b. Accordingly, a cable 120b includes lines 125 to 128 that transfer output of the magnetism sensors 146a to 146d in place of the lines 124a and 124b. This contributes to reducing the size of the plug 140c while increasing the number of lines in the cable.

Figure 6:
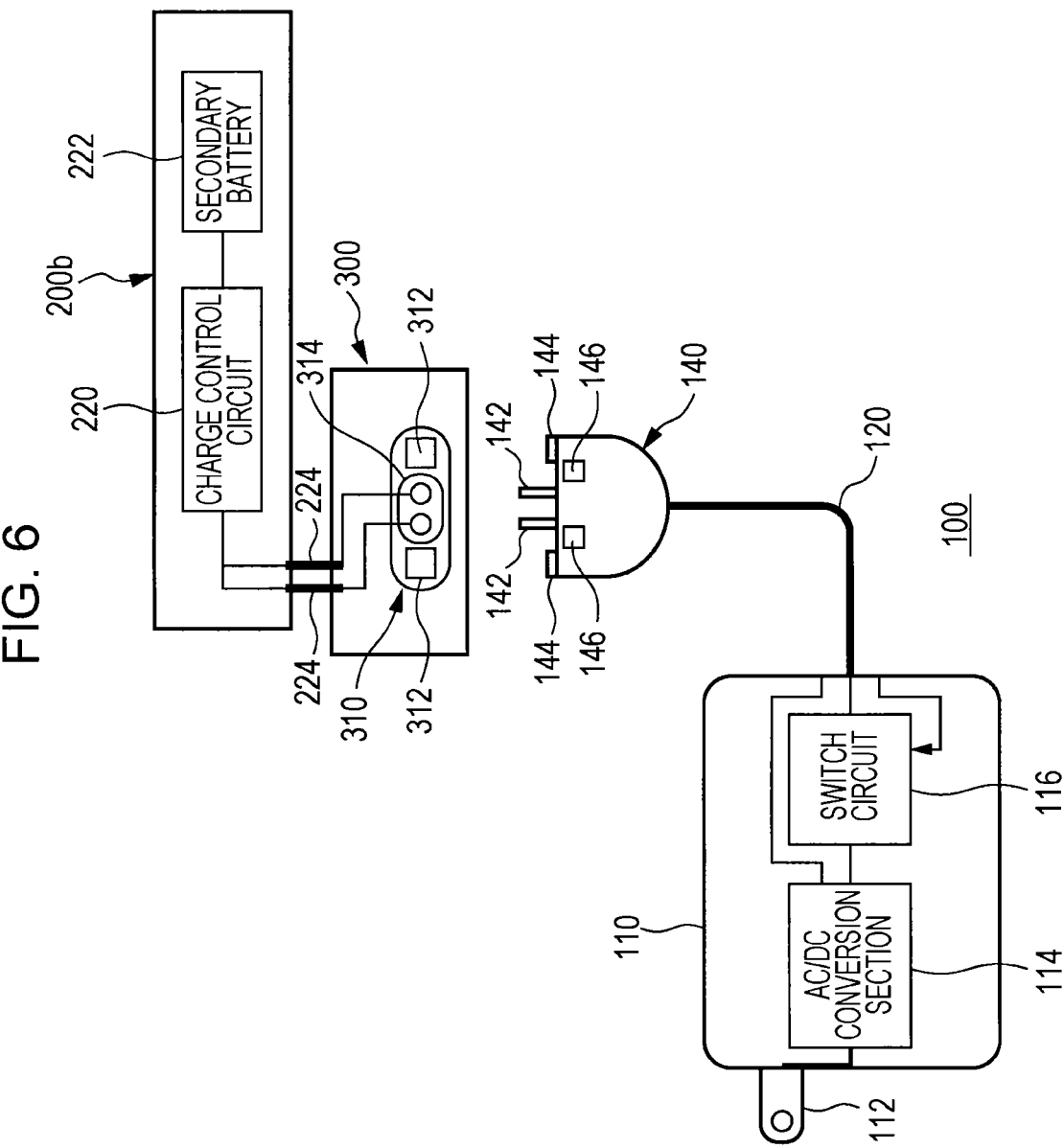
FIG. 6 shows a schematic configuration of a charging device according to a second embodiment of the present disclosure and an electronic device including a secondary battery to be charged by the charging device via a charging cradle.

FIG. 6 shows a schematic configuration of a charging device 100 according to a second embodiment of the present disclosure and an electronic device 200b including the secondary battery 222 to be charged by the charging device 100 via a charging cradle 300. Elements that are the same as the elements shown in FIG. 1 are denoted by the same reference numerals to omit overlapping description.

In general, a cradle is a stand-type extension device on which an electronic device such as a portable information device can be mounted, and enables charge, data exchange, and so forth when the main body of the electronic device is placed on the cradle. The charging cradle 300 according to the embodiment is used together with a charging device to charge an electronic device. In this sense, the charging cradle 300 is not necessarily of a stand type, and may simply be an adapter.

A connection portion 310 of the charging cradle 300 including a socket 314 to which the plug 140 is to be connected is provided on the charging cradle side rather than on the electronic device side. The socket 314 is connected to the charge control circuit 220 of the electronic device 200b via contact terminals 224.

Interposing the charging cradle 300 serving as an adapter between the electronic device and the charging device eliminates the need to provide magnets on the electronic device side.

The thus configured charging cradle 300 can be used in combination with any of the configurations of FIGS. 2 to 5 discussed above.

According to the embodiment described above, there is provided (1) a charging device comprising: a first connector configured to be connected to a power source; a second connector configured to be connected to and supply a voltage to the electronic device; a magnetic element configured to be connected to a magnet of an electronic device; a magnetic sensor configured to detect a magnetic force generated by the magnet of the electronic device; and a switch circuit disposed between the first connector and the second connector and configured to switch between an open state and a closed state based on an output of the magnetic sensor.

(2) The charging device of (1), wherein the switch circuit switches to the open state when an output of the magnetic sensor indicates that a magnetic force is detected.

(3) The charging device of (1) or (2), wherein the switch circuit switches to the closed state when an output of the magnetic sensor indicates that a magnetic force is not detected.

(4) The charging device of any of (1) to (3), wherein the magnetic element includes first and second metal plates configured to be attached to respective first and second magnets of the electronic device.

(5) The charging device of any of (1) to (4), wherein the magnetic sensor includes first and second magnetic sensors.

(6) The charging device of (5), further comprising: a gate circuit connected to the first and second magnetic sensors and configured to output a signal indicating whether a magnetic force is detected at both of the first and second magnetic sensors.

(7) The charging device of (6), wherein the switch circuit switches to the open state when an output of the gate circuit indicates that a magnetic force is detected at both of the first and second magnetic sensors.

(8) The charging device of (6) or (7), wherein the switch circuit switches to the closed state when an output of the gate circuit indicates that a magnetic force is not detected at both of the first and second magnetic sensors.

(9) The charging device of any of (1) to (8), wherein the gate circuit is an AND circuit.

(10) The charging device of any of (1) to (5), wherein the first magnetic sensor is configured to detect a first magnetic polarity and the second magnetic sensor is configured to detect a second magnetic polarity that is different from the first magnetic polarity.

(11) The charging device of (10), further comprising: a gate circuit connected to the first and second magnetic sensors and configured to output a signal indicating whether a magnetic force of the first magnetic polarity is detected at the first magnetic sensor and a magnetic force of the second magnetic polarity is detected at the second magnetic sensor.

(12) The charging device of (11), wherein the switch circuit switches to the open state when an output of the gate circuit indicates that a magnetic force of the first magnetic polarity is detected at the first magnetic sensor and a magnetic force of the second magnetic polarity is detected at the second magnetic sensor.

(13) The charging device of (11) or (12), wherein the switch circuit switches to the closed state when an output of the gate circuit indicates that a magnetic force of the first magnetic polarity is not detected at the first magnetic sensor and/or a magnetic force of the second magnetic polarity is not detected at the second magnetic sensor.

(14) The charging device of any of (1) to (5), wherein the first and second magnetic sensors are configured to detect a respective polarity of a magnetic force applied to the first and second magnetic sensors.

(15) The charging device of (14), wherein the switch circuit is configured to reverse a polarity of the voltage supplied to the electronic device from the second connector based on an output of the first and second magnetic sensors.

(16) The charging device of any of (1) to (10), wherein the magnetic sensor includes a third magnetic sensor configured to detect the second magnetic polarity and a fourth magnetic sensor configured to detect the first magnetic polarity.

(17) The charging device of (16), wherein the first magnetic sensor is disposed in close proximity to the third magnetic sensor and the second magnetic sensor is disposed in close proximity to the fourth magnetic sensor.

(18) The charging device of (17), further comprising: a first gate circuit connected to the first magnetic sensor and the second magnetic sensor; and a second gate circuit connected to the third magnetic sensor and the fourth magnetic sensor.

(19) The charging device of (18), wherein the switch circuit is configured to control a polarity of the voltage supplied to the electronic device from the second connector based on an output of the first and second gate circuit.

(20) The charging device of (19), wherein the switch circuit is configured to control the polarity of the voltage supplied to the electronic device from the second connector to be a first polarity when an output of the first gate indicates that that a magnetic force of the first polarity is detected at the first magnetic sensor and a magnetic force of the second polarity is detected at the second magnetic sensor and control the polarity of the voltage supplied to the electronic device from the second connector to be a second polarity, which is opposite the first polarity, when an output of the second gate indicates that that a magnetic force of the second polarity is detected at the third magnetic sensor and a magnetic force of the first polarity is detected at the fourth magnetic sensor.

While preferred embodiments of the present disclosure have been described above, various changes and modifications other than those mentioned above may be made. That is, it should be understood as a matter of course by those skilled in the art that various modifications, combinations, and other embodiments may occur depending on design requirements and other factors insofar as they are within the scope of the appended claims or the equivalents thereof.

For example, an indicator (e.g. an LED) is provided on the electronic device side, in general, and caused to emit light to allow recognition of whether a charge operation has been started normally. However, such an indicator may be provided on the charging device side to be lit up on the basis of a control signal.

While the plug terminal 112 is directly coupled to the body portion 110, another plug may be provided for connection via another cable (not shown) led from the body portion 110. The cable 120 is not an essential element.

Depending on the type of the electronic device, power may be acquired from a USB connection portion of a PC or the like rather than from the commercial power source. In this case, the AC/DC conversion section 114 is not necessary.

The invention claimed is:

1. A charging device comprising:
a first connector configured to be connected to a power source;
a second connector configured to be connected to and supply a voltage to the electronic device;
a magnetic element configured to be connected to a magnet of an electronic device;
a magnetic sensor configured to detect a magnetic force generated by the magnet of the electronic device, wherein the magnetic sensor comprises
a first magnetic sensor configured to detect a first magnetic polarity;
a second magnetic sensor configured to detect a second magnetic polarity that is different from the first magnetic polarity;
a third magnetic sensor configured to detect the second magnetic polarity;
a fourth magnetic sensor configured to detect the first magnetic polarity;
a first logic circuit connected to the first magnetic sensor and the second magnetic sensor; and
a second logic circuit connected to the third magnetic sensor and the fourth magnetic sensor; and
a switch circuit disposed between the first connector and the second connector and configured to control the polarity of the voltage supplied to the electronic device from the second connector to be a first polarity when an output of the first logic circuit indicates that a magnetic force of the first polarity is detected at the first magnetic sensor and a magnetic force of the second polarity is detected at the second magnetic sensor and control the polarity of the voltage supplied to the electronic device from the second connector to be a second polarity, which is opposite the first polarity, when an output of the second logic circuit indicates that a magnetic force of the second polarity is detected at the third magnetic sensor and a magnetic force of the first polarity is detected at the fourth magnetic sensor.

2. The charging device of claim 1, wherein
the switch circuit switches to an open state when an output of the magnetic sensor indicates that a magnetic force is detected.

3. The charging device of claim 1, wherein
the switch circuit switches to a closed state when an output of the magnetic sensor indicates that a magnetic force is not detected.

4. The charging device of claim 1, wherein
the magnetic element includes first and second metal plates configured to be attached to respective first and second magnets of the electronic device.

5. The charging device of claim 1, wherein
the switch circuit switches to an open state when an output of the first logic circuit indicates that a magnetic force is detected at both of the first and second magnetic sensors.

6. The charging device of claim 1, wherein the switch circuit switches to a closed stated when an output of the first logic circuit indicates that a magnetic force is not detected at both of the first and second magnetic sensors.

7. The charging device of claim 1, wherein the first logic circuit is an AND circuit.

8. The charging device of claim 1, wherein
the switch circuit switches to an open state when an output of the first logic circuit indicates that a magnetic force of the first magnetic polarity is detected at the first magnetic sensor and a magnetic force of the second magnetic polarity is detected at the second magnetic sensor.

9. The charging device of claim 1, wherein
the switch circuit switches to the closed state when an output of the first logic circuit indicates that a magnetic force of the first magnetic polarity is not detected at the first magnetic sensor and/or a magnetic force of the second magnetic polarity is not detected at the second magnetic sensor.

10. The charging device of claim 1, wherein
the first magnetic sensor is disposed in close proximity to the third magnetic sensor and the second magnetic sensor is disposed in close proximity to the fourth magnetic sensor.

11. The charging device of claim 1, wherein
the first logic circuit is a first gate circuit; and
the second logic circuit is a second gate circuit.

12. The charging device of claim 11, wherein
the switch circuit is configured to control the polarity of the voltage supplied to the electronic device from the second connector based on the output of the first and second gate circuit.

13. The charging device of claim 12, wherein
the switch circuit is configured to control the polarity of the voltage supplied to the electronic device from the second connector to be the first polarity when the output of the first gate indicates that that the magnetic force of the first polarity is detected at the first magnetic sensor and the magnetic force of the second polarity is detected at the second magnetic sensor and control the polarity of the voltage supplied to the electronic device from the second connector to be the second polarity, when the output of the second gate indicates that that the magnetic force of the second polarity is detected at the third magnetic sensor and the magnetic force of the first polarity is detected at the fourth magnetic sensor.

14. A charging device comprising:
a first connector configured to be connected to a power source;
a second connector configured to be connected to and supply a voltage to the electronic device;
a magnetic element configured to be connected to a magnet of an electronic device;
a magnetic sensor configured to detect a magnetic force generated by the magnet of the electronic device, wherein the magnetic sensor comprises
a first magnetic sensor configured to detect a first magnetic polarity;
a second magnetic sensor configured to detect a second magnetic polarity that is different from the first magnetic polarity;
a third magnetic sensor configured to detect the second magnetic polarity;
a fourth magnetic sensor configured to detect the first magnetic polarity; and
a switch circuit disposed between the first connector and the second connector and configured to control the polarity of the voltage supplied to the electronic device from the second connector to be a first polarity when a magnetic force of the first polarity is detected at the first magnetic sensor and a magnetic force of the second polarity is detected at the second magnetic sensor and control the polarity of the voltage supplied to the electronic device from the second connector to be a second polarity, which is opposite the first polarity, when a magnetic force of the second polarity is detected at the third magnetic sensor and a magnetic force of the first polarity is detected at the fourth magnetic sensor.

* * * * *